United States Patent Office 2,854,473  
Patented Sept. 30, 1958

---

2,854,473
METHOD FOR PREPARING ACRYLONITRILE

David C. Spaulding, Cuyahoga Falls, and Fred J. Wherley, Cleveland, Ohio, assignors to The B. F. Goodrich Company, New York, N. Y., a corporation of New York No Drawing. Application March 26, 1957
Serial No. 648,514

5 Claims. (Cl. 260—465.3)

This invention relates to an improved method for the preparation of acrylonitrile and relates more specifically to the preparation of acrylonitrile by a vapor phase reaction of acetylene with hydrogen cyanide induced by a fluidized catalyst material.

Preparation of acrylonitrile by a vapor phase reaction of acetylene with hydrogen cyanide in the presence of a catalyst is known. Many types of catalyst including alkali and alkaline earth metal cyanides, hydroxides, carbonates and the like have been proposed for this reaction and such catalysts are ordinarily deposited on an inert support. Ordinarily the vapor phase reaction of acrylonitrile with hydrogen cyanide has been obtained in reactors having a fixed bed catalyst. The fixed bed technique has many drawbacks including short catalyst life, tendency of the catalyst to become sintered or stuck together, difficulty in controlling and obtaining a uniform heat of reaction throughout the fixed catalyst bed and related problems arising out of these listed difficulties. When the catalyst in the fixed bed sinters or sticks together it is difficult to replace the spent short life catalyst with fresh material. Further, the poor thermoconductivity of the catalyst makes it impossible to remove the large exothermic heat of reaction so as to maintain uniform temperature control.

In an effort to overcome these and other disadvantages of the fixed bed catalyst for vapor phase preparation of acrylonitrile from hydrogen cyanide and acetylene, a fluidized catalyst system was proposed. It was found that a fluidized catalyst system of sodium hydroxide treated charcoal alone, which is an efficient fixed bed catalyst for this reaction, could not be controlled or maintained. Although the finely divided charcoal impregnated with sodium hydroxide could be fluidized with nitrogen gas in a suitable reactor, when the reactant gases acetylene and hydrogen cyanide were introduced at reaction temperature the bed sintered and set up to an essentially fixed bed with the formation of intense hot spots causing the reaction to go out of control and leading to rapid decomposition of acetylene in the reaction chamber. Even before this undesirable effect was noted, some of the catalyst material was blown out of the reactor and was thus lost to the reaction.

It was then discovered, quite unexpectedly, that the use of a fluidized bed comprised alkali metal hydroxide impregnated charcoal and sand could be maintained in a fluidized state by an entering gas stream which contained hydrogen cyanide and acrylonitrile, and that rapid and efficient conversion of hydrogen cyanide and acetylene to acrylonitrile was obtained with excellent temperature control. In essence the improved process involves reacting hydrogen cyanide with acetylene by counter-current passing of these two materials through a fluidizable bed of catalyst material heated to a temperature of about 580 to 620° C. The catalyst material comprises an intimate mixture of finely divided alkalized sand and hardwood charcoal impregnated with sodium hydroxide maintained in a fluidized state by the entering gas stream, portions of the catalyst bed being periodically or continuously replaced to permit continuous efficient operation of the process, with subsequent recovery of acrylonitrile, and if desired, recycling any unreacted hydrogen cyanide and acetylene back through the reactor. It is necessary that the particle size of the alkali impregnated charcoal and sand be within hereinafter defined limits and also that the proportions of sand to charcoal also be used in hereinafter defined ratios in order to obtain the advantages of the enhanced and improved process of this invention.

By means of this improved process acrylonitrile is efficiently and continuously prepared by a vapor phase reaction of hydrogen cyanide and acetylene with the formation of no undesirable by-products which interfere with the normal polymerization of the resulting acrylonitrile. In addition it is possible by means of this invention to provide acrylonitrile in high yield without the formation of dangerous by-products. An easily controlled continuous process, and maintenance and control of uniform temperature during the course of the reaction are other advantages of the invention. Further advantages accrue from the use of a fluidizable catalyst material which overcomes previous difficulties with short life fixed bed catalyst. No shutdown periods are required to replace catalyst because of short catalyst life and build-up of impurities, and the formation of hot spots in the catalyst phase which often causes poor yields and undesirable decomposition products is prevented.

The improved catalyst of the invention comprises a finely divided carbonaceous material impregnated with an alkali metal cyanide, hydroxide or carbonate. A catalyst material found most useful in the improved process of this invention is sodium hydroxide on a finely divided unactivated hardwood charcoal derived from maple. Any wood or cellulosic charcoal may be used but unactivated charcoal prepared from hardwood is ordinarily preferred. Charcoals having low surface area, preferably of the order of about 1 to 20 square meters per gram as determined by nitrogen absorption, are also preferred. The particle size of the charcoal average from about 8 to about 200 mesh (about 0.1 to 0.003 inch diameter). More preferably, the charcoal has an average particle size of from about 25 to 120 mesh (0.028 to 0.0049 inch) with a density of about 0.5 to 0.20 gram per cc. Catalyst materials prepared from activated charcoal and other carbonaceous materials including bone charcoal, cocoanut charcoal, coke, graphite, carbon black pellets and the like are not as completely satisfactory as is unactivated hardwood charcoal. Useful catalyst materials have also been prepared from pumice, diatomaceous earth and alpha-aluminum oxide.

The catalyst material is prepared for use by impregnating the desired material such as charcoal in a solution of alkali metal hydroxide, cyanide or carbonate. Many different procedures may be employed to prepare the catalyst material but the most generally preferred technique involves suspending the hardwood charcoal in a boiling aqueous solution of the desired catalyst, which ordinarily will be an alkali metal (of the first group of the periodic table) hydroxide, of known concentration, cooling the solution, filtering off the impregnated charcoal and drying. The amount of alkali metal hydroxide deposited on the charcoal is readily controlled by the concentration of the impregnating solution. Large particle size charcoal may be impregnated and then ground to the proper size. The preferred catalyst is sodium hydroxide and the percent of sodium hydroxide used based on the weight of charcoal may be varied from about 1% to about 20%, more preferably from about 6% to about 10% by weight. It has been found that charcoals from different sources often have varying activity and a useful expedient in raising low level activity charcoal to a uniform level equivalent to that of the more active materials is the use of a small amount of a barium salt in addition to the alkali metal hydroxide as is disclosed in U. S. Patent 2,502,678.

The other essential ingredient of the cofluidizable catalyst material is an inert finely divided material such as sand. This inert material should have an average particle size from about 25 to about 230 mesh (0.03 to 0.0024 inch diameter). A preferred material is a high silica content sand having an average particle size of about 100 to 200 mesh (0.0059 to 0.0029 inch). For most efficient operation of the defined process the sand or other inert material is treated with alkali metal hydroxide such as sodium hydroxide to contain sodium hydroxide, based on the sand, of about 0.05% to 0.5% by weight. Use of alkali treated sand with the alkali impregnated charcoal results in better overall efficiency including higher conversion and yield. Other inert materials in addition to sand which may be employed in conjunction with the treated charcoal are alpha-aluminum oxide and ceramic materials which may be treated with alkali and sodium meta-silicate which does not require alkalizing.

To obtain the advantages of this invention it is necessary that the sand or other inert material be present in amount from about 20 to about 70 volume percent of the total catalyst material charge and 80 to 30 volume percent of carbonaceous material. If less than about 20 volume percent sand is employed, poor fluidization and sintering of the catalyst results. If more than about 70 volume percent sand is employed there is a substantial drop in catalyst and reactor productivity. For optimum operations a fluidizable bed comprising about 30–40 volume percent alkalized sea sand of about 100 to 200 mesh size and containing about 0.2% sodium hydroxide thereon and about 70–60 volume percent unactivated hardwood charcoal of about 40 to 80 mesh impregnated with about 8% sodium hydroxide is employed. This system is readily fluidized, portions of catalyst material may be continuously or incrementally replaced during the reaction of acetylene with hydrogen cyanide, and excellent temperature control and efficient conversion of acetylene and hydrogen cyanide to acrylonitrile is obtained. For most efficient cofluidization of the catalyst material, the particle size ratio of charcoal to sand will vary from substantially equal particle size materials to mixtures of materials in which the charcoal is about 5 times the size of the sand.

The rate of removal and addition of catalyst material in a reactor is readily controlled and normally will vary between about 5 to 20 percent per hour as desired or required by operating conditions set forth in detail hereinafter. Another advantage of the defined catalyst material is the ease of regeneration of the used catalyst by treatment with steam at 500 to 600° C.

In the practice of the invention a vertical tubular glass or stainless steel reactor tube mounted in an electric furnace and equipped with a feed system for delivering reactant gases, and diluent gas if desired, feed and removal system for the catalyst material, and a product recovery system is employed. In a specific apparatus a Pyrex tube reactor placed in an electric furnace is employed, the tube having the lower end fitted with a catalyst withdrawal tube and a gas entry tube ahead of a catalyst entry tube. An outlet at the top of the reactor leads the gaseous reaction products to a product recovery system. In the operation of the equipment the reactor is heated to a temperature of about 550° C., with nitrogen entering the reactor through the gas entry tube at a rate sufficient to fluidize the catalyst material which is added either through the top of the reactor or at the bottom of the reactor together with the gas stream. The acetylene and hydrogen cyanide are then introduced and the furnace adjusted to give a catalyst bed temperature of about 580 to 620° C. During the course of the reaction, portions of the fluidized catalyst bed are removed periodically through the catalyst withdrawal tube and are replaced with an equal volume of catalyst in the reactor.

A dry diluent gas may be introduced with the hydrogen cyanide or acetylene if desired and may be nitrogen, methane, hydrogen, benzene, xylene and the like. Excellent results are obtained in the absence of any diluent gas. The exit gases from the acrylonitrile recovery system may be recycled directly to the reactor after proper make-up with fresh acetylene and hydrogen cyanide.

The temperature at which the reaction is conducted is above a threshold temperature of 460 to 480° C. The most favorable reaction temperature is in the range of about 580 to 620° C., preferably below about 640° C.

The molar ratio of hydrogen cyanide and acetylene is not critical and may be varied widely but to attain the best advantages of this invention, ratios of at least about equimolar ratios of reactants to an excess of acetylene should be employed to give the highest yields of acrylonitrile. Preferably the excess of acetylene is from about 0.01 to 2 mols per mol of hydrogen cyanide.

The acrylonitrile can be recovered from the gaseous reaction product in a number of different ways. For example, one method comprises passing the reaction gases from the reactor into a scrubbing tower where the gases are scrubbed with an acidic material such as sodium acid sulfate to remove basic impurities. The scrubbing tower is heated to drive off acrylonitrile and hydrogen cyanide which are then collected and condensed in cold traps and separated by distillation. Another method consists in absorption of the reaction gases in a petroleum fraction such as kerosene followed by fractionation to obtain acrylonitrile. Still other methods include absorption of the acid washed reaction gases in water followed by fractionation of the solution thus formed and drying the azeotrope containing acrylonitrile obtained thereby. The unreacted acetylene, if any, and hydrogen cyanide from these recovery and purification steps may be recycled in the improved continuous process and used again.

The recovered acrylonitrile prepared by the process of this invention after distillation is ordinarily about 95% acrylonitrile and 4+% acetonitrile depending on the recovery system used and may be satisfactorily employed in standard polymerization recipes to prepare polyacrylonitrile, copolymers of polyacrylonitrile, for cyanoethylation reactions and the like. By removing the acetonitrile impurity with water the purity of the distilled acrylonitrile is readily raised to 99+% purity.

Of the variables in this process the following statements are made based on many experimental studies for the guidance of those skilled in the art to establish reaction conditions in a variety of systems and processes. The extent of the reaction of hydrogen cyanide with acetylene to make acrylonitrile is primarily controlled by the activity of the catalyst (composition and temperature), the contact time, and the concentration of hydrogen cyanide in the entering gas stream for a given catalyst material and constant composition of the entering gas stream. The extent of reaction is also proportional at constant contact time to the temperature of the catalyst bed within the specified range. For a given catalyst composition and temperature, and for constant entering gas composition, the extent of reaction considered as total conversion of hydrogen cyanide is directly proportional to the contact time. For a given catalyst composition and temperature and at constant contact time the reaction appears to show a first order dependency from the concentration of hydrogen cyanide in the entering gas stream when the total conversion of hydrogen cyanide is considered. It will be obvious from these generalizations and the statements herein and the examples which follow that variation in the process may be made without departing basically from the principles of the improved process described herein.

The rate of gas flow through the reactor must be such that the defined catalyst material is cofluidized by upward flow of the reactive gases therethrough without large gas bubble formation and loss of catalyst by excess gas flow, and at a sufficient contact time for the reaction gases with the catalyst to obtain efficient conversion. This rate ordinarily will be such that the fluidized bed is essentially just maintained suspended and in motion as can be readily determined by observation or simple test by those skilled in the art and at a contact time of about 1 to about 5, preferably about 2–3 seconds. Contact time is based on linear velocity and the height of the catalyst bed (expanded volume in fluidized beds):

$$\text{Contact time} = \frac{\text{Linear velocity (cm./sec.)}}{\text{Height of bed (cm.)}}$$

Height of the bed is the measured depth of the operating bed. In this fluidized system the expanded volume of the preferred catalyst material is in the range of about 1.4 to 1.7 times the tapped, settled volume of catalyst material. Linear velocity refers to the combined entering gases and is calculated on the basis of the empty reactor with the gases at 610° C.

$$\text{Linear velocity} = \frac{\text{Entering gas rate at 610°C. (cc./sec.)}}{\text{Cross sectional area of reactor (cm.}^2\text{)}}$$

Space velocity is reported in terms of cubic centimeters of gas S. T. P. (0° C., 760 mm.) per cubic centimeter bed hour. For normal operations and at normal co-fluidization of the catalyst material a contact time of one second requires a space velocity of about 1100 (S. T. P.), at three seconds 367 (S. T. P.) and five seconds 220 (S. T. P.) It will be recognized by the man skilled in the art that in large reactors with large amounts of catalyst material and high velocity gas flow that larger particle size catalyst material, near the upper end of the defined particle size range, will be employed, each of these factors being interrelated and dependent on the desired contact time for the reaction which should be substantially equivalent to about 1 to 5 seconds at about 600° C.

To specifically demonstrate the operation of the invention, maple hardwood charcoal of particle size 40 to 80 mesh (0.014 to 0.008 inch) is impregnated by slow boiling for 10 minutes in a 7% sodium hydroxide solution. The hot slurry is cooled to room temperature and filtered. After drying to constant weight at 115° C. the catalyst charcoal contains 8% sodium hydroxide by weight. Washed sea sand having an average particle size of 100 to 200 mesh (0.0059 to 0.0029 inch) is heated for 10 minutes with 2% sodium hydroxide solutions and dried to constant weight of 125° C. to contain about 0.19% sodium hydroxide. These two materials are then mixed together in a ratio of 35 weight percent charcoal and 65 weight percent sand. This is equivalent to a volume ratio of 70 to 30. Diluent gas, nitrogen, is passed through the reactor while it is being heated until the temperature reaches about 350 to 400° C. Then the catalyst material is blown into the reactor in the gas line by entering the tube down stream from the nitrogen inlet. In this series of reactions, with a reactor tube having an inner diameter of 38 millimeters and a length of 60 centimeters, 180 grams of catalyst was employed with 160 grams in the active bed and the remainder in the drain tube. The active bed volume is about 370 milliliters at a height of about 34 cm. Ordinarily the catalyst material initially charged is material from previous runs. Acetylene is added to the diluent gas before the temperature in the reactor reaches 500° C. Hydrogen cyanide is then added to the feed gas when the temperature in the reactor reaches 550° C. The diluent gas flow may then be stopped if no diluent is to be used, and the flow rates, temperature and pressure to be used during the reaction are established. The effluent gases from the reactor are passed through absorption towers and/or cold traps and the acrylonitrile absorbed and/or condensed and separated by distillation.

In one test run methane was used as a diluent and the space velocity of the reaction mixture was 622 with an apparent contact time of 1.8 seconds, an absolute pressure in the reactor in millimeters of mercury 794.1, a temperature of about 607° C. and a catalyst replacement rate of 13.3 grams per hour (8.3% of bed per hour) for 12 hours. The molar ratio of acetylene to hydrogen cyanide was 1.09 and the total fed gas rate in mols per hour was 10.28. The percent yield of acrylonitrile based on the acetylene charged was 97.2% over the 12 hour period.

In another typical run the above procedure is essentially repeated without diluent gas at a space velocity of 608, contact time of 1.8 seconds, pressure of 759.3 mm. and a molar ratio of acetylene to hydrogen cyanide of 1.31. The yield of acrylonitrile in this case based on acetylene is 73.8%.

The first procedure above is repeated at a space velocity of 577, apparent contact time of 1.9 seconds, a pressure of 746.9 mm. a temperature of 612° C. and a molar ratio of acetylene to hydrogen cyanide of 1.005. A recovered yield of acrylonitrile of 87.7% based on acetylene charged is obtained.

In another test run sodium meta-silicate having an average particle size of 100 to 200 mesh is used in place of sand following the procedures given above. 35 weight percent sodium meta-silicate and 65 weight percent charcoal are employed. The catalyst productivity in grams of acrylonitrile per gram catalyst per hour is 0.30 which is comparable to a value of 0.20 obtained with the above-described alkalized sea sand.

We claim:

1. A method for preparing acrylonitrile which comprises passing a mixture of acetylene and hydrogen cyanide through a fluidizable catalyst material comprising about 30 to 80 volume percent of a carbonaceous material having a particle size of about 0.1 to 0.003 inch and containing about 1 to 20 weight percent of an alkali metal hydroxide and about 70 to 20 volume percent of a material having an average particle size from about 0.03 to 0.0025 inch selected from the class consisting of sodium metasilicate and sand at a rate sufficient to fluidize said catalyst material and at a temperature of about 500 to 640° C. and thereafter recovering the resulting acrylonitrile.

2. A method for preparing acrylonitrile which comprises passing a mixture of acetylene and hydrogen cyanide through a fluidizable catalyst material comprising about 30 to 70 volume percent of a charcoal having an average particle size of about 0.03 to 0.005 inch and an alkali metal hydroxide content of about 6 to about 10 weight percent and about 70 to 30 volume percent of alkalized sand having an average particle size of about 0.006 to 0.003 inch at a rate sufficient to fluidize said catalyst material and provide a reaction contact time of about 1 to 5 seconds at a temperature of about 580 to 620° C. and thereafter recovering the resulting acrylonitrile.

3. A method for preparing acrylonitrile which comprises passing a mixture of acetylene and hydrogen cyanide in which there is an excess of acetylene over hydrogen cyanide through a fluidizable catalyst at a rate sufficient to fluidize said catalyst and obtain a contact time of 1 to 5 seconds at a temperature of about 580 to 620° C., said catalyst material comprising about 60 to 70 volume percent of an unactivated hardwood charcoal having an average particle size of about 0.028 to 0.0049 inch and impregnated with about 6 to 10 weight percent of sodium hydroxide and about 40 to 30 volume percent of a high silica sand having an average particle size of about 0.0059 to 0.003 inch containing from about 0.05 to 0.5 weight percent sodium hydroxide and thereafter recovering the resulting acrylonitrile.

4. A method for preparing acrylonitrile which comprises passing a mixture of acetylene and hydrogen cyanide containing a ratio of one mol of hydrogen cyanide and 1 to 2 mols of acetylene through a fluidizable catalyst material at a temperature of about 580 to 620° C. and a rate to obtain a contact time of about 1 to 5 seconds, said catalyst material comprising about 35 weight percent hardwood charcoal of an average particle size from about 0.014 to 0.008 inch containing about 6 to 10 weight percent sodium hydroxide and about 65 weight percent high silica sand having an average particle size of about 0.0059 to 0.0029 inch containing about 0.2% by weight of sodium hydroxide and thereafter recovering the resulting acrylonitrile.

5. A method for preparing acrylonitrile which comprises passing a mixture of acetylene and hydrogen cyanide containing a molar excess of 0.01 to 2.0 mols of acetylene through a fluidizable catalyst at a rate sufficient to obtain a contact time of said acetylene and hydrogen cyanide with said catalyst material of about 2 to 3 seconds at a temperature of about 600 to 620° C. in a reactor and during the course of said reaction simultaneously removing and adding from about 5 to about 20 weight percent per hour of catalyst material in the reactor, said catalyst material comprising about 35 weight percent unactivated maple charcoal having a surface area of about 1 to 10 square meters per gram of a particle size of about 0.014 to 0.008 inch containing about 8% sodium hydroxide and 65 weight percent high silica sand having an average particle size of about 0.0059 to 0.0029 inch containing about 0.2% sodium hydroxide and thereafter recovering the resulting acrylonitrile.

References Cited in the file of this patent

UNITED STATES PATENTS

| | | |
|---|---|---|
| 2,413,496 | Green et al. | Dec. 31, 1946 |
| 2,419,186 | Harris et al. | Apr. 15, 1947 |
| 2,502,678 | Spaulding et al. | Apr. 4, 1950 |
| 2,789,126 | Anderson et al. | Apr. 16, 1957 |

FOREIGN PATENTS

| | | |
|---|---|---|
| 135,340 | Australia | Nov. 17, 1949 |